Nov. 23, 1926.
F. A. HENRY
1,607,951
SHIPPING DEVICE
Filed March 12, 1925
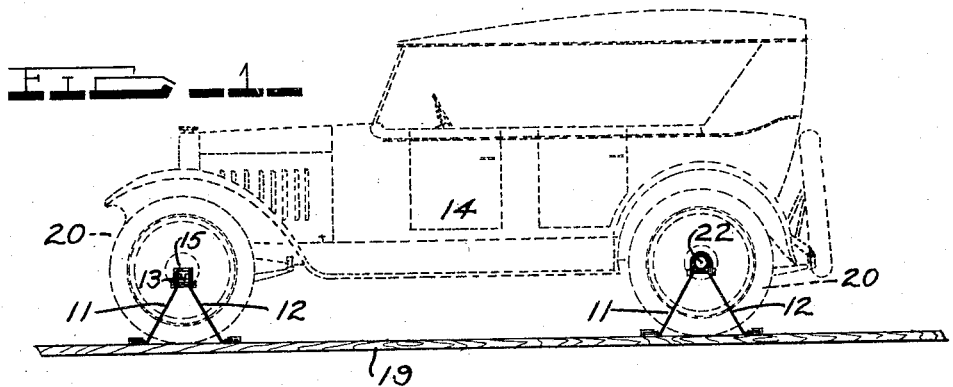
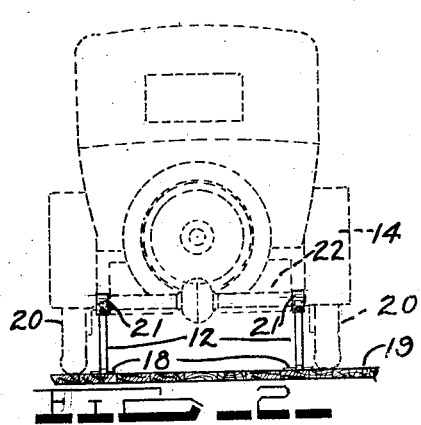
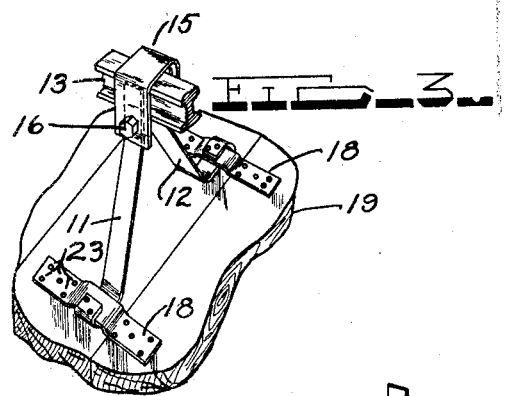
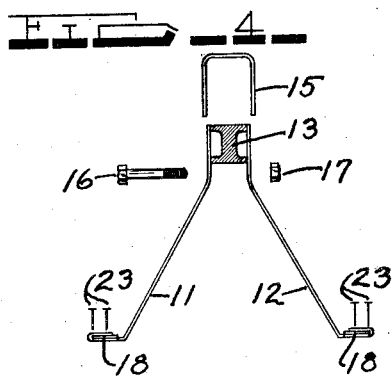
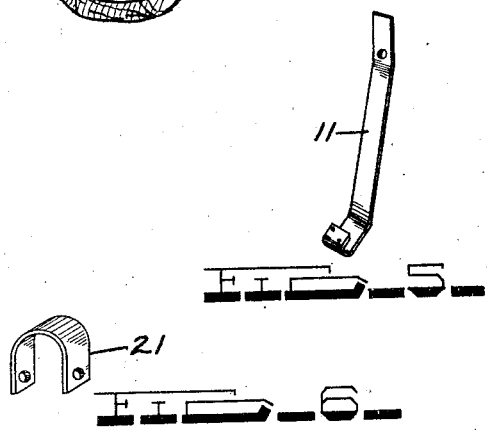
INVENTOR
FRANK A. HENRY
BY
P. M. Pomeroy
ATTORNEY Patented Nov. 23, 1926.

1,607,951

UNITED STATES PATENT OFFICE.

FRANK A. HENRY, OF DETROIT, MICHIGAN, ASSIGNOR TO THE STUDEBAKER CORPORATION, OF SOUTH BEND, INDIANA, A CORPORATION OF NEW JERSEY.

SHIPPING DEVICE.

Application filed March 12, 1925. Serial No. 15,170.

This invention relates to improvements in devices used in connection with the shipping of automobiles in railroad freight cars.

Prior to this time considerable difficulty has been encountered in obtaining a suitable hold-down device whereby an automobile may be held in position on a freight car floor during transit. The automobile being shipped is of considerable weight and the movement of the freight car has a tendency to cause the automobile to be violently thrown forward or backward as the case may be, according to the various shocks and strains imposed thereon, resulting in serious damage to the automobile when the same is not properly secured to the freight car. It has been common practice with hold-down devices of this type and bucks used heretofore to completely destroy them after the load had reached its destination, which resulted in a considerable loss of time, material and expense in constructing new ones.

Therefore it is one of the objects of the present invention to provide a hold-down device for transporting automobiles which is simple in construction, economical to manufacture and which will efficiently fulfill the duties for which it is intended.

Another object is to provide a hold-down device which can be disassembled when the automobile, which it held in position in a freight car, reaches its destination, and conveniently packed and returned to the original shipping point.

A further object is to provide a hold-down device composed of metal legs and removable tie down members, with interchangeable clamping members which clamp over the axles of the vehicle being shipped to hold the legs firmly against said axles.

These being among the objects of the present invention, the same consists of certain features of construction and combinations of parts to be hereinafter described with reference to the accompanying drawing and then claimed, having the above and other objects in view.

In the accompanying drawing which illustrates a suitable embodiment of the present invention and in which like numerals refer to like parts throughout the several views, Figure 1 is a side view of an automobile secured in shipping position to the freight car floor with my improved hold-down devices.

Figure 2 is a rear end view of the automobile and hold-down devices shown in Figure 1.

Figure 3 is a perspective view showing a hold-down device secured to a portion of the front axle of an automobile.

Figure 4 is a side view showing all the parts of the hold-down device in disassembled position.

Figure 5 is a perspective view of one of the supporting legs of the hold-down device.

Figure 6 is a perspective view of the clamping member for the rear axle, the one for the front axle being clearly shown in Figure 3.

Referring particularly to Figures 3 and 4, the present invention embodies two upwardly extending convergent legs 11 and 12 of comparatively stiff metal, adapted to be secured to the front axle 13 of the vehicle 14 by a substantially U-shaped clamping member 15, the sides of which extend down over the axle 13 and outside of the sides of the legs 11 and 12. A bolt 16, which extends below the axle 13 through the sides of the clamping member 15 and legs 11 and 12, is provided with a nut 17 threaded thereon which when tightened, draws the legs 11 and 12 firmly and securely in fixed position against the sides of the axle 13.

The bottom ends of the legs 11 and 12 are bent out horizontally and then bent back upon themselves to form hooked portions which receive transverse removable tie down members 18. The tie down members are secured to the car floor 19 by suitable spikes 23 or the like and to provide additional securing means, some of the spikes 23 are driven into the floor 19 through both the hooked portions of the legs 11 and 12 and the tie down members 18.

Two such hold-down devices are preferably used for each axle and are placed at each end thereof as near to the wheels 20 as possible, the clamping member 21 for the rear axle 22 being provided with a rounded portion instead of a square portion as in member 15 to afford a closer fit around the rear axle 22.

In loading an automobile on a freight car floor with a device of this kind, the rear tires are first partially deflated and then the legs 11 and 12 are secured to the axles 13 and 22 by the clamping members 15 and 21 respectively, by tightening the nuts 17 on the bolts 16. The tie down members 18 are then inserted in the hooked ends of the legs 11 and 12 and pulled out horizontally and secured to the floor 19 by suitable spikes 23 or the like. The brakes are set and the tires inflated which because of the tension in the legs 11 and 12 increases the friction between the tires and the floor, which increased friction in combination with the hold-down device tends to resist the tendency of the automobile to move forward or backward caused by the movement of the freight car.

When the freight car loaded with several automobiles reaches its destination and the automobiles are unloaded, the hold-down devices are disassembled completely, all the leg portions being bundled together and all the tie down members bundled together as well as the U-shaped members. In this condition they can be packed in a very small space and returned to be used over again, thereby cutting down shipping costs and the expense and time in constructing new ones.

It is evident that many advantages can be obtained in having hold-down devices of this nature which can be completely disassembled and returned for further use by the shipper.

Formal changes may be made in the specific embodiment of the invention described without departing from the spirit and substance of the broad invention, the scope of which is commensurate with the appended claims.

What I claim is:—

1. In a device for holding vehicles against relative longitudinal movement on the floor of a freight car during shipment, a pair of independent upwardly convergent strip metal legs clamped at their upper ends to an axle of said vehicle, the lower ends of said legs being reversely bent to receive a removable transverse holding plate between the bent end and body of each of said legs, and means extending through said legs and said plates for securing said legs to said plates and for securing said plates to said floor.

2. A shipping device for preventing forward and backward movement of a motor vehicle being shipped in a freight car comprising a pair of independent upwardly converging legs, an inverted U-shaped member extending over an axle of said vehicle, means for clamping said legs to said axle comprising a bolt passing through said U-shaped member and said legs and beneath said axle, and transverse members each having a raised portion to receive said legs for securing said legs to the floor of said freight car.

3. Means for holding vehicles against longitudinal movement relative to the floor of a freight car during shipment, comprising a pair of independent metal members secured to the floor of said car in spaced relation on either side of an axle of said vehicle, each of said members extending upwardly at an angle and then vertically to abut against said axle, a U-shaped strap member having its open end extending downwardly receiving said axle and the ends of said members, and a bolt for clamping said strap and members against said axle.

4. A device for holding vehicles against relative longitudinal movement on the floor of a freight car during shipment, comprising a pair of independent spaced upwardly convergent strip metal legs having vertically extending free ends abutting against an axle of said vehicle and reversely bent lower ends, a U-shaped strap having its open end extending downwardly to receive said axle and the ends of said legs, a bolt for clamping said strap and said legs to said axle, a holding plate for each leg having floor attaching portions and a raised portion to receive said legs adjacent the reversely bent ends, means independent of said legs for securing said plates to the floor, and means for securing said plates in said reversely bent ends and providing additional means for securing said plates to said floor.

Signed by me at Detroit, Michigan, U. S. A., this 5th day of March, 1925.

FRANK A. HENRY.